(12) United States Patent
Pott et al.

(10) Patent No.: US 6,920,862 B2
(45) Date of Patent: Jul. 26, 2005

(54) METHODS FOR CONTROLLING A FUEL METERING IN THE MULTIPLE INJECTION OPERATING MODE

(75) Inventors: Ekkehard Pott, Gifhorn (DE); Eric Bree, Wolfsburg (DE); Kai Philipp, Lagesbüttel (DE); Michael Zillmer, Sickte (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 10/473,088

(22) PCT Filed: Feb. 13, 2002

(86) PCT No.: PCT/EP02/01492

§ 371 (c)(1),
(2), (4) Date: Feb. 2, 2004

(87) PCT Pub. No.: WO02/077434

PCT Pub. Date: Oct. 3, 2002

(65) Prior Publication Data

US 2004/0103873 A1 Jun. 3, 2004

(30) Foreign Application Priority Data

Mar. 27, 2001 (DE) .......................................... 101 15 966

(51) Int. Cl.$^7$ ................................................. F02B 3/00

(52) U.S. Cl. ........................ 123/299; 123/300; 60/285

(58) Field of Search ................................. 123/299, 300; 60/285

(56) References Cited

U.S. PATENT DOCUMENTS

| 6,044,642 | A | * | 4/2000 | Nishimura et al. ............ 60/285 |
| 6,142,121 | A | * | 11/2000 | Nishimura et al. ......... 123/456 |
| 6,434,929 | B1 | * | 8/2002 | Nishimura et al. ............ 60/278 |
| 6,446,618 | B1 | * | 9/2002 | Hill ............................. 123/698 |
| 2004/0118116 | A1 | * | 6/2004 | Beck et al. .................... 60/601 |

* cited by examiner

Primary Examiner—John T. Kwon
(74) Attorney, Agent, or Firm—Norris McLaughlin & Marcus PA

(57) ABSTRACT

The invention relates to two methods for controlling a fuel metering of a direct-injection internal combustion engine (10) in a multiple injection operating mode according to which at least two fuel injections into a cylinder (12) are carried out during a compression cycle of the cylinder (12) of the internal combustion engine (10) by means of at least one injection valve (22). The invention provides that a pressure (rail pressure, $P_R$), under which the fuel is stored in front of the injection valve (22), is present in such a manner and/or injected fuel portions of the individual injections of a combustion cycle and/or a total fuel quantity, which is injected during a multiple injection, are varied in such a manner as to prevent a forthcoming valve opening time ($\Delta t$) of the injection valve (22) from falling below a preset valve opening time ($\Delta t_K$) during at least one injection of a combustion cycle. The inventive measures ensure, with simple means, a precise fuel metering in the multiple injection operating mode and thus enable an application of the multiple injection operating mode over wide operating ranges, particularly also in the low load operating mode and idle operating mode.

18 Claims, 2 Drawing Sheets

METHODS FOR CONTROLLING A FUEL METERING IN THE MULTIPLE INJECTION OPERATING MODE

Figure 1:
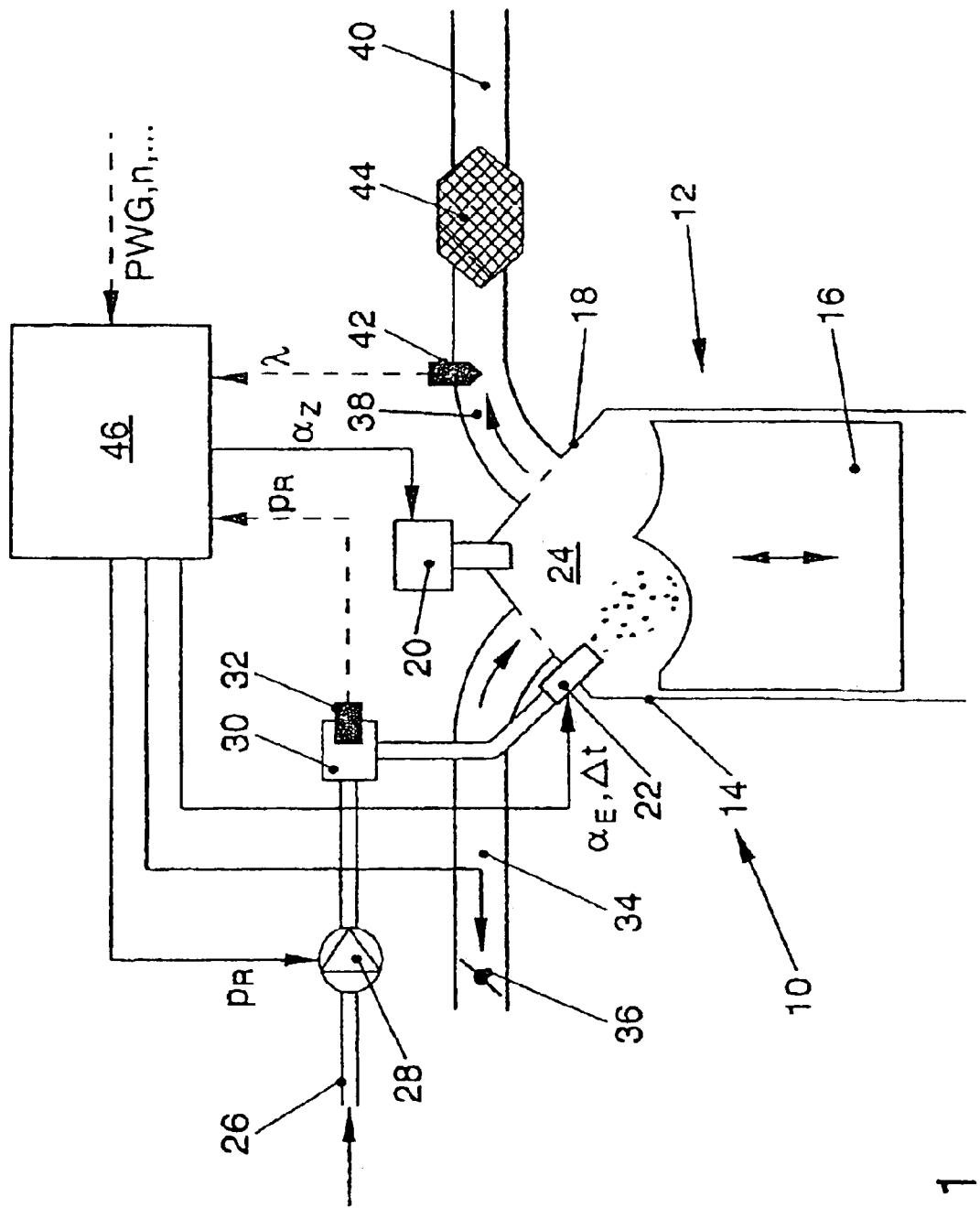

The invention relates to a method for controlling fuel metering of a direct-injection internal combustion engine in a multiple injection operating mode.

Various methods are known for increasing an exhaust gas temperature of internal combustion engines after a cold start so as to accelerate warm-up of a catalytic converter connected downstream and render the catalytic converter ready for use.

It is known to retard an ignition angle, i.e., the time when an air-fuel mixture in a cylinder is ignited, relative to an ignition angle that provides the highest efficiency during the warm-up phase. Retardation of the ignition angle reduces the efficiency of the combustion while simultaneously increasing an exhaust gas temperature. The hotter exhaust gas causes the catalytic converters to heat up faster. The method of retarding ignition reaches its limits at ignition angles where the internal combustion engine begins to run unacceptably rough and reliable ignition can no longer be guaranteed.

Another method for increasing the exhaust gas temperature includes so-called multiple injection which has recently been described for direct-injection, spark-ignition internal combustion engines, where the fuel is injected directly through injection valves into a combustion chamber of a cylinder (WO 00/08328, EP 0 982 489 A2, WO 00/57045). In this case, a total fuel quantity to be supplied during an operating cycle of a cylinder is divided into two parts and supplied in two injection processes to the combustion chamber of the cylinder. A first early injection (homogeneous injection) takes place during an intake stroke of the cylinder so that the injected fuel quantity is at the following ignition time at least substantially homogeneously distributed in the combustion chamber. On the other hand, a second late injection (stratified injection) is carried out during a following compression stroke, in particular during the second half of the compression stroke, resulting in a so-called stratified charge where the injected fuel cloud is essentially concentrated in the region surrounding a spark plug of the cylinder. Accordingly, multiple injection operating mode of the internal combustion engine involves a mixed operation of stratified charging and homogeneous charging. The particular ignition characteristic of the multiple injection operating mode results in an increased exhaust gas temperature compared to a completely homogeneous operation. In addition to increasing the exhaust gas temperature, multiple injection advantageously also reduces raw emission of nitric oxides $NO_x$ and unburned hydrocarbons HC, thereby reducing pollutant breakthrough during the warm-up phase.

However, precise metering of the fuel during the multiple injection can present a problem. By dividing the total fuel quantity to be supplied during an operating cycle over at least two injections, the valve open times of an injection valve operated under high-pressure can be extremely short. If the valve open times fall below a critical value, then the injection valve operates in a so-called ballistic region which is characterized by an increasing variance of a fuel throughput. The problem associated with imprecise fuel metering can be aggravated under low engine loads, particularly in idle, which results in particularly short valve open times due to the small required fuel quantity. Disadvantageously, no concept for feedback control of the air-fuel ratio produced by two or more injections has been developed to date.

It is therefore an object of the present invention to propose a method which ensures precise fuel metering in a multiple injection operating mode. The method should also be integratable in an existing engine control concept without adding significant process-related complexity.

According to the first method of the invention, a pressure, at which the fuel is supplied or stored before the injection valve, is preset so that a resulting valve open time of the injection valve in at least one injection of an operating cycle does not fall below a predetermined valve open time. Preferably, this pressure, hereinafter also referred to as rail pressure, is preset so that the injection valve does not operate in a ballistic region in any of the injection processes to be carried out during the operating cycle. The rail pressure it is hereby lowered when the presently existing or required valve open times reach or fall below the preset critical valve open time. The reduced rail pressure results in a reduced fuel throughput of the injection valve and hence longer valve open times since these depend on the rail pressure. As a result, operation of the injection valves in the so-called ballistic region can be avoided and the fuel metering can be controlled with high accuracy.

According to a preferred embodiment of the method, the rail pressure is set to a most 35 bar, in particular to a most 30 bar, preferably to at most 25 bar. This value is significantly lower than conventional rail pressures of 40 to 120 bar.

In general, the rail pressure can be maintained at the reduced level during the entire multiple injection operating mode. However, the rail pressure can advantageously also be controlled as a function of an engine load and/or an engine rotation speed. In this embodiment, characteristic curves stored in an engine controller are used to determine the optimum rail pressure as a function of the operating point. The optimum rail pressure is hereby the greatest possible pressure at which the preset critical valve open time is not underrun.

According to another method of the invention, the fuel fractions of the individual injections of an operating cycle and/or or a total fuel quantity injected during a multiple injection are varied in such a way that a resulting valve open time during at least one injection, preferably during all injections, of an operating cycle does not fall below a preset valve open time.

In particular, if the fuel fractions of the individual injections, i.e. the different valve open times, differ, then the fuel quantity injected during a shorter injection is increased at the expense of at least one longer injection, until the shorter valve open time corresponds at least approximately to the preset valve open time. However, this change in the fuel fractions reaches its limit where the decreasing duration of the longer injection time reaches the critical preset valve open time. If this measure alone does not provide the desired valve open times, then the rail pressure can be reduced in addition.

In the event that all valve open times of the injections of an operating cycle fall below the preset valve open time and/or if in spite of the variation of the fuel fractions of the individual injections at least one valve open time of an injection falls below the preset valve open time, then this state can be initially tolerated according to another embodiment of the method. The total fuel quantity supplied during an operating cycle is increased only if a correction imposed by a lambda controller increases to a point where a predeterminable threshold is exceeded. This is preferably implemented by increasing all fuel quantities supplied in the individual injections proportional to their fuel fractions. This measure can advantageously also be combined with a reduction in the rail pressure. Moreover, an additional useful torque produced by the increased total fuel quantity can be at least partially compensated by measures that reduce the engine efficiency, in particular by an adjustment of an ignition angle, preferably by retarding the ignition timing. Instead of increasing the supplied total fuel quantity or if the supplied total fuel quantity exceeds an acceptable amount, the multiple injection operating mode may also be blocked. In this case, other heating measures for the catalytic converter, for example a single injection with late ignition, can be implemented.

As already mentioned several times, the measures for reducing the rail pressure can be advantageously combined with changes in the fuel fractions of the individual injections and/or of the total fuel quantity, so as to ensure valve open times greater than the preset valve open times.

The preset value of the critical valve open time depends essentially on an acceptable variance of a fuel throughput through the injection valve. The preset valve open time represents hereby a threshold, above which the injection valve operates with an average variance of the fuel throughput of a most ±20%, in particular of a most ±15%, preferably of a most ±10%. Since the average variance of the fuel throughput as a function of the valve open time depends on the particular design of an injection valve, actual minimum valve open time are difficult to predict. As a guideline, conventional high-pressure injection valves can have, for example, a valve open time of 550 µs, in particular 600 µs, preferably 700 µs, which represents a boundary limit to the ballistic region. These values can show significant upward or downward deviations, depending on the design characteristic of the high-pressure injection valve. Other known valves have an acceptable valve open time of 300 µs, in particular 350 µs, preferably 450 µs.

In addition to the problem associated with short valve open times and the resulting imprecise fuel metering, a concept is lacking that allows feedback control of the fuel metering of the individual injections of an operating cycle based on a single exhaust gas signal. According to another embodiment of the method, a single injection of a fuel quantity to be injected during an operating cycle can be regulated, while the fuel quantity to be injected with the at least one additional injection of the operating cycle can be pilot-controlled. In an actual situation with two injections, where a first injection occurs during an intake stroke of a cylinder and a second injection occurs during a compression stroke, either the early injection can be pilot-controlled and the late injection can be regulated, or alternatively the early injection can be regulated and the late injection can be pilot-controlled. The pilot control is implemented in a known manner based on stored characteristic curves which correlate an engine load demand, in particular a throttle position in an air intake duct and/or a gas pedal position signal, with a required fuel quantity. A pilot-control value determined in this way for the pilot-controlled injection is then maintained, while the corresponding other injection is controlled in a known manner based on a concentration of at least one exhaust gas component measured in the exhaust gas, in particular oxygen. Alternatively, all injections of an operating cycle can be regulated proportional to their fuel fractions to be injected. In addition, all injections of an operating cycle can be pilot-controlled until a gas sensor, in particular a lambda sensor, that measures the concentration of the exhaust gas component, has reached its operation-ready state. The time delay for reaching the operation-ready state is essentially determined by a minimum temperature of the gas sensor and the length of the exhaust gas duct between the cylinder and the gas sensor.

Additional advantageous embodiments are recited in the dependent claims.

Embodiments of the invention will be described in more detail hereinafter with reference to the appended drawings.

Figure 2:
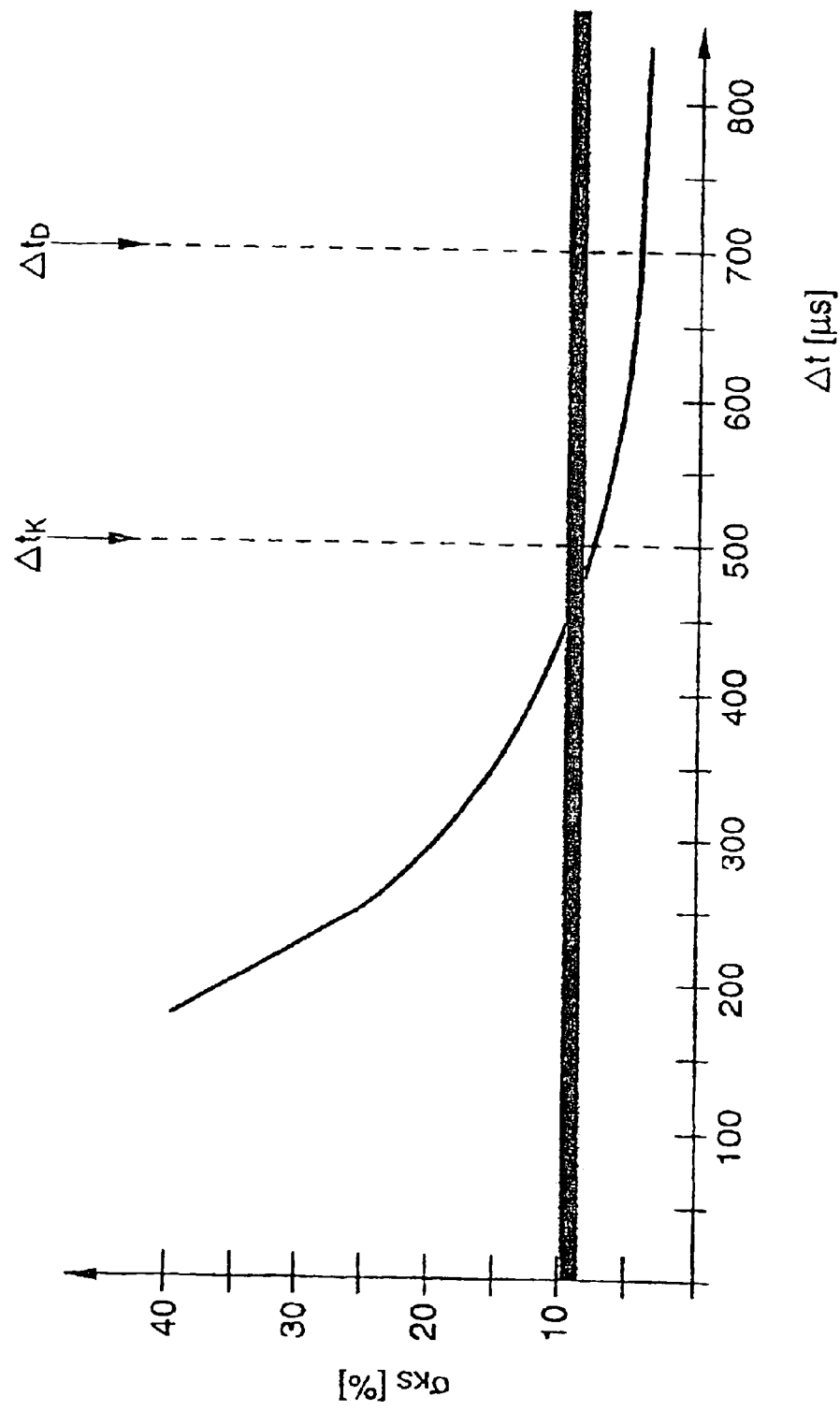

It is shown in:

FIG. 1 schematically the configuration of a cylinder of an internal combustion engine with associated control elements, and FIG. 2 a curve with an average variance of the fuel throughput as a function of the open time of an injection valve.

FIG. 1 shows an exemplary single cylinder 12 of a spark-ignition four-stroke internal combustion engine 10 capable of running in a lean mode. A piston 16 is axially movable in a cylinder housing 14 of the cylinder 12. A spark plug 20 with an ignition coil is located in a central upper position of a cylinder head 18 of the cylinder housing 14; located at a lateral position is a high-pressure injection valve 22 for enabling direct fuel injection into a combustion chamber 24 of the cylinder 12. Fuel is supplied to the injection valve 22 via a fuel line 26. The fuel is pumped out of a fuel tank (not shown) by a fuel pump (not shown) and the fuel pressure is reduced. A high-pressure pump 28 generates a fuel pressure which in a typical vehicle operating mode is between 40 and 120 bar. The fuel pressure is preset depending on an operating point of the internal combustion engine 10. The high-pressure pump 28 in cooperation with a pressure control valve (not shown) smoothes pressure variations in a fuel rail 30 disposed before the injection valve 22. The pressure at which the fuel is supplied to the injection valve 22 after the rail 30 is hereinafter referred to as rail pressure $P_R$. The rail pressure $P_R$ is measured with a pressure sensor 32 disposed in the rail 30. An air intake channel 34 which supplies fresh air terminates in the cylinder head 18 of the cylinder 12. The position of a throttle 36 disposed in the air intake channel 34 controls an air mass flow. In addition, an outlet tube 38 terminates in the combustion chamber 24, moving exhaust gas from the combustion chamber 24 as well as exhaust gases from the other cylinders to an exhaust gas channel 40. A lambda sensor 42 arranged in the outlet tube 38 or in the exhaust gas channel 40 measures an oxygen concentration in the exhaust gas for regulating the air-fuel ratio supplied to the internal combustion engine 10 and the cylinders 12, respectively. A catalytic converter 44 arranged in the exhaust gas channel 40 converts pollutants contained in the exhaust gas. An operating state of the internal combustion engine 10 is controlled by an engine controller 46, taking into account various available operating data.

The catalytic converter 44 has typically not yet reached an operating temperature required for adequate conversion of pollutants, particularly after an engine cold start. This is recognized by the engine controller 46, for example by a temperature sensor signal measured before, after or inside the catalytic converter 44. To increase an exhaust gas temperature and to accelerate warm-up of the catalytic converter 44, the motor controller 46 switches the internal combustion engine 10 to a multiple injection operating mode. During an intake stroke of the cylinder 12, a first early fuel injection occurs through the injection valve 22, while a second late fuel injection takes place in a following compression stroke, in particular during the second half of the compression stroke. The corresponding injection angles $\alpha_E$ and valve open times $\Delta t$ of the injection valve 22 as well as an ignition angle $\alpha_z$ of the spark plug 20 are preset by the engine controller 46. The fuel supplied during the early injection is present in the combustion chamber 24 at the time of ignition $\alpha_z$ in the form of an essentially homogeneous mixture. Conversely, the fuel supplied during the late injection forms a stratified charge cloud which is concentrated at the ignition time $\alpha_z$ in the region of the spark plug 20. The formation of the so-called stratified charge is aided by providing the piston head of piston 16 with a special trough-shaped contour. Distributing the total fuel quantity supplied during an operating cycle of the cylinder 12 over two injection processes requires very short valve open times $\Delta t$ of the injection valve 22, which can cause problems resulting in imprecise fuel metering.

A average percentage variance of the fuel throughput $\sigma_{KS}$ as a function of the valve open time $\Delta t$ is shown more clearly in FIG. 2. Above a valve open time of approximately 700 $\mu s$, the fuel throughput has an small, approximately constant variance of approximately 5%. Below $\Delta t_b$, the injection valve 22 operates in the so-called ballistic region, which is characterized by a rapidly increasing variance of the fuel throughput quantity $\sigma_{KS}$ with decreasing valve open times. This stochastic variance of the fuel metering between the individual operating cycles of the cylinder 12 causes the lambda control to continuously and frequently intervene, accompanied by a generally imprecise adjustment of the air-fuel ratio. With a typical rail pressure $p_R$ of 40 to 120 bar when the internal combustion engine 10 is idling, the valve open times of the two injections in multiple injection mode are typically in the range of 350 to 500 $\mu s$ and hence in the inaccurate ballistic region. According to the invention, the rail pressure $p_R$ and/or the total supplied fuel quantity and/or the fractions of the fuel quantities to be supplied during the injections as part of the total fuel quantity are to be preset and/or to be varied such that they do not fall below a preset critical valve open time $\Delta t_K$. According to the exemplary curve depicted in FIG. 2, a critical valve open time $\Delta t_K$ of approximately 500 $\mu s$ would have to be set for a maximum acceptable variance of the fuel metering of approximately ±10%. Preferably, however, a more conservative value is preset that is close to or equal to the ballistic limit $\Delta t_b$. It should be mentioned again that the depicted curve as well as the described values are only exemplary and depend strongly on the design characteristic of the injection valve 22.

If the engine controller 46 recognizes that the valve open time $\Delta t$ of the early and/or of the late injection is less than the preset opening time $\Delta t_K$, then the controller 46 initially increases the fuel quantity to be supplied during the shorter injection at the expense of the longer injection. This adjustment of the injected fractions reaches its limit where the longer injection time is reduced so far that it approaches the ballistic region of the injection valve 22. If both injections are in the ballistic region, then this situation is tolerated until a correction initiated by the lambda controller exceeds a predetermined threshold value. Only then is the total supplied fuel quantity increased, whereby the valve open times $\Delta t$ of both injections are increased so that preferably both injections operate with valve open times $\Delta t$ above the predetermined limit $\Delta t_K$. A useful engine torque generated by the increased total fuel quantity can be more or less compensated by adjusting, preferably retarding, the ignition angle $\alpha_z$. Alternatively or in addition, the rail pressure $p_R$ in the multiple injection operating mode can be lowered, preferably to less than 25 bar. Advantageously, the reduction of the rail pressure can be controlled as a function of an engine load expressed by a pedal position signal PWG and/or an engine rotation speed n. A lower rail pressure $p_R$ is preset for smaller engine loads, where only a small quantity of fuel is required and the valve open times $\Delta t$ are therefore short, than for large engine loads.

In addition, one of the two injections in multiple injection operating mode, for example the early injection during the intake stroke, can be pilot-controlled and the other injection, for example the late injection during a compression stroke, can be regulated. The engine controller 46 hereby determines a required air mass flow as a function of the requested engine load, in particular based on a pedal position signal PWG, and the throttle 36 is controlled accordingly. At the same time or depending on the throttle position, the engine controller 46 computes the required total fuel quantity to be supplied and distributes the total fuel quantity over the two fuel injections according to an optimal parameter choice. The valve open time $\Delta t$ of the injection valve 22 for the pilot-controlled, early injection is preset based on the stored characteristic curves and held constant. Conversely, the regulated, late injection is controlled via the lambda signal measured by the lambda sensor 42 in the exhaust gas. The valve open time $\Delta t$ of the late injection is hereby adjusted depending on a deviation of the measured lambda value from a nominal setting. Alternatively, the valve open times $\Delta t$ of both injections can also be controlled proportional to their fraction of the total valve open time and/or the total injected fuel quantity.

The measures according to the invention make it possible to easily, accurately and reliably meter the fuel in a multiple injection operating mode. The multiple injection operating mode can then be implemented over wide operating ranges, in particular when operating under low-load or idling. The method can be easily integrated in an existing engine controller configuration without increasing its complexity.

List of Reference Numerals 10 internal combustion engine
12 cylinder
14 cylinder housing
16, piston
18 cylinder head
20 spark plug
22 injection valve
24 combustion chamber
26 fuel line.
28 high-pressure pump
30 fuel rail
32 pressure sensor
34 air intake channel
36 throttle
38 outlet tube
40 exhaust gas channel
42 gas sensor/lambda sensor
44 catalytic converter
46 engine controller
$\alpha_E$ injection angle
$\alpha_Z$ ignition angle
$\lambda$ air value lambda
$\Delta t$ valve open time
$\Delta t_b$ limit of the valve open time towards ballistic region
$\Delta t_K$ critical valve open time
n engine rotation speed
$p_R$ rail pressure
PWG pedal position signal
$\sigma_{KS}$ average variance of the fuel throughput

What is claimed is:

1. Method for controlling fuel metering of a direct-injection internal combustion engine in a multiple injection operating mode, wherein at least two fuel injections into a cylinder occur through an injection valve during an operating cycle of a cylinder of the internal combustion engine, characterized in that at least one of the parameters
   (a) pressure (rail pressure, $p_R$), at which the fuel is supplied before the injection valve, or
   (b) injected fuel fractions of the individual injections of an operating cycle, is preset so that a valve open time ($\Delta t$) of the injection valve resulting from the at least one parameter does not fall below a predetermined valve open time ($\Delta t_K$) during at least one injection of the operating cycle.

2. Method according to claim 1, characterized in that the rail pressure ($p_R$) is set to a most 35 bar.

3. Method according to claim 2, characterized in that the rail pressure ($p_R$) is set to a most 30 bar, in particular to a most 25 bar.

4. Method according to claim 1, characterized in that the rail pressure ($p_R$) is controlled as a function of an engine load and/or an engine rotation speed.

5. Method according to claim 1, characterized in that if the fuel fractions and valve open times ($\Delta t$) of the individual injections of the operating cycle differ, then the fuel quantity injected during a shorter injection is increased at the expense of at least one longer injection until the shorter valve open time ($\Delta t$) corresponds at least approximately to the preset valve open time.

6. Method according to claim 5, characterized in that, if all valve open times ($\Delta t$) of the injections of an operating cycle fall below the preset valve open time ($\Delta t_K$) and/or in spite of the variation of the fuel fractions of the individual injections at least one valve open time ($\Delta t$) of an injection falls below the preset valve open time ($\Delta t_K$), then a total fuel quantity supplied during an operating cycle is increased until the resulting valve open time ($\Delta t$) of at least one injection of an operating cycle does not fall below the preset valve open time.

7. Method according to claim 6, characterized in that the total fuel quantity supplied during an operating cycle is increased only when a control intervention of a lambda controller exceeds a presettable threshold.

8. Method according to claim 6, characterized in that a useful torque produced by the increased total fuel quantity is at least partially compensated by measures that reduce the engine efficiency, in particular by an adjustment of an ignition angle.

9. Method according to claim 1, characterized in that if all valve open times ($\Delta t$) of the injections of an operating cycle fall below the preset valve open time ($\Delta t_K$) and/or if in spite of a variation of the fuel fractions of the individual injections at least one valve open time ($\Delta t$) of an injection falls below the preset valve open time ($\Delta t_K$), then the multiple injection operating mode is blocked.

10. Method according to claim 1, characterized in that the preset valve open time corresponds to at least a critical valve open time ($\Delta t_K$), where an average variance of a fuel throughput ($\sigma_{KS}$) is still acceptable, and that in particular the preset valve open time essentially corresponds to a ballistic valve open time ($\Delta t_b$).

11. Method according to claim 10, characterized in that above the preset critical valve open time ($\Delta t_K$) the injection valve operates with an average variance of a fuel throughput ($\sigma_{KS}$) of a most ±20%, in particular of a most ±15%, in particular of a most ±10%.

12. Method according to claim 1, characterized in that the preset valve open time is 550 $\mu$s, in particular 600 $\mu$s, in particular 700 $\mu$s.

13. Method according to claim 12, characterized in that the preset valve open time is 300 $\mu$s, in particular 350 $\mu$s, in particular 450 $\mu$s.

14. Method according to claim 1, characterized in that a fuel quantity to be injected during an operating cycle is regulated based on a deviation of an actual fuel quantity from a nominal fuel quantity and that a fuel quantity to be injected through the at least one additional injection of the operating cycle is pilot-controlled.

15. Method according to claim 1, characterized in that all injections of an operating cycle are regulated proportional to their fuel fractions to be injected, depending on the difference between the actual fuel quantity and the nominal fuel quantity.

16. Method according to claim 14, characterized in that all injections of an operating cycle are pilot-controlled until a gas sensor, in particular a lambda sensor, that measures the concentration of the exhaust gas component has reached its operation-ready state.

17. Method according to claim 15, characterized in that the pilot control performed using characteristic parameter fields that depend on the engine load.

18. Method according to claim 14, characterized in that the nominal fuel quantity to be injected is regulated based on a concentration of at least one exhaust gas component, in particular oxygen, measured in the exhaust gas.

* * * * *